US009956527B2

(12) United States Patent
Lord

(10) Patent No.: US 9,956,527 B2
(45) Date of Patent: May 1, 2018

(54) MEMBRANE FILTER SYSTEM

(75) Inventor: Garfield R. Lord, Providenciales (TC)

(73) Assignee: Bionest Technologies Inc., Grand-Mere (CA)

(*) Notice: Subject to any disclaimer, the term of this patent is extended or adjusted under 35 U.S.C. 154(b) by 837 days.

(21) Appl. No.: 13/636,513

(22) PCT Filed: Mar. 23, 2011

(86) PCT No.: PCT/CA2011/000307
§ 371 (c)(1),
(2), (4) Date: Nov. 13, 2012

(87) PCT Pub. No.: WO2011/116467
PCT Pub. Date: Sep. 29, 2011

(65) Prior Publication Data
US 2013/0048560 A1 Feb. 28, 2013

Related U.S. Application Data

(60) Provisional application No. 61/317,023, filed on Mar. 24, 2010.

(51) Int. Cl.
B01D 65/02 (2006.01)
B01D 61/18 (2006.01)
(Continued)

(52) U.S. Cl.
CPC .............. B01D 61/18 (2013.01); B01D 61/20 (2013.01); B01D 63/082 (2013.01);
(Continued)

(58) Field of Classification Search
CPC ...... B01D 61/18; B01D 61/20; B01D 63/082; B01D 2313/08; B01D 2313/26; B01D 2315/06; B01D 2321/185
See application file for complete search history.

(56) References Cited

U.S. PATENT DOCUMENTS 2,247,143 A * 6/1941 Bailey ........................... 210/637
6,843,908 B2 * 1/2005 Okajima et al. .............. 210/151
(Continued)

FOREIGN PATENT DOCUMENTS

JP        2001029952 A  *  2/2001  ............. B01D 61/18
WO   WO2007122839 A1 * 11/2007  ........... B01D 63/082
WO   WO2009004962 A1 *  1/2009  ........... B01D 63/081

OTHER PUBLICATIONS

Oxford Dictionary, "The Concise Oxford Dictionary," 10th ed., ed. Judy Pearsall, Oxford University Press, New York, 1999, 3 pages.*
(Continued)

Primary Examiner — Bobby Ramdhanie
Assistant Examiner — Denise R Anderson
(74) Attorney, Agent, or Firm — Pepper Hamilton LLP

(57) ABSTRACT

A guide member for directing gas bubble flow along a membrane surface, the guide member having first and second side edges defining a channel for gas bubbles to flow along, the channel having an open bottom end through which the gas bubbles can enter the channel and an open top end through which the bubbles can exit the channel, and a diverting means adjacent the channel bottom end arranged to direct at least some of the incident gas bubbles in a first direction towards the channel bottom end. A membrane module assembly and a membrane filter system including the guide member.

12 Claims, 18 Drawing Sheets

(51) Int. Cl.
*B01D 61/20* (2006.01)
*B01D 63/08* (2006.01)
*C02F 3/12* (2006.01)
*C02F 1/44* (2006.01)

(52) U.S. Cl.
CPC ........ *C02F 3/1273* (2013.01); *B01D 2313/08* (2013.01); *B01D 2313/26* (2013.01); *B01D 2315/06* (2013.01); *B01D 2321/185* (2013.01); *C02F 1/442* (2013.01); *C02F 1/444* (2013.01); *C02F 2303/16* (2013.01); *Y02W 10/15* (2015.05)

(56) References Cited

U.S. PATENT DOCUMENTS

| | | | | |
|---|---|---|---|---|
| 7,022,238 | B2* | 4/2006 | Eguchi et al. | 210/650 |
| 2004/0232076 | A1* | 11/2004 | Zha et al. | 210/636 |
| 2007/0007214 | A1* | 1/2007 | Zha | B01D 61/18 |
| | | | | 210/718 |
| 2007/0023348 | A1* | 2/2007 | Harms | B01D 63/081 |
| | | | | 210/321.72 |
| 2008/0098702 | A1* | 5/2008 | Simmons et al. | 55/471 |
| 2009/0026139 | A1 | 1/2009 | Zha et al. | |
| 2009/0223895 | A1 | 9/2009 | Zha et al. | |
| 2010/0000935 | A1* | 1/2010 | Sakai | B01D 63/082 |
| | | | | 210/455 |
| 2010/0096317 | A1* | 4/2010 | Morita | B01D 63/081 |
| | | | | 210/321.84 |

OTHER PUBLICATIONS

Ndinisa, N. V., Fane, A. G. & Wiley, D. E.; Fouling Control in a Submerged Flat Sheet Membrane System: Part I—Bubbling and Hydrodynamic Effects; Separation Science & Technology Journal; 2006, 41: 1383-1409.

PCT/CA2011/000307 International Search Report dated Jun. 16, 2011.

Patent Examination Report dated Sep. 19, 2014 in corresponding Australian Patent No. 2011231171.

* cited by examiner (b)

MEMBRANE FILTER SYSTEM

This application is the U.S. National Stage filing under 35 U.S.C. § 371 of International Application Serial No. PCT/CA2011/000307 filed Mar. 23, 2011, which claims priority to U.S. Provisional Application No. 61/317,023 filed Mar. 24, 2010, each of which is incorporated herein by reference in its entirety.

FIELD OF THE INVENTION

The present invention generally relates to membrane filter systems and more specifically, though not exclusively, to submerged flat sheet membrane filter systems and membrane module assemblies.

BACKGROUND OF THE INVENTION

Membrane filters are commonly used in domestic and industrial water treatment systems to separate solids from liquids. Not only are they used to treat wastewater but they are also used to improve the water quality of lakes, ponds and rivers. A typical wastewater treatment system includes the biological decomposition of the wastewater using microbes in a bioreactor followed by the filtration of the decomposed wastewater through a membrane filter. The resulting permeate that passes through the membrane filter is the treated water whilst the solid debris separated from the permeate collects on the membrane surfaces or as sludge in the bioreactor.

It will be appreciated that with use, a solid deposit commonly known as "filter cake" builds up on the membrane surface. The thickness of the filter cake increases with time of use. This membrane fouling decreases the flow of the wastewater through the membrane filter and gradually reduces the efficacy of the membrane filter until it must be replaced or cleaned. This can lead to down-time of the treatment process which is both costly and inconvenient and increases operating costs. Often an over-sized membrane filter must be utilized to account for the increasingly unusable membrane surface over time and to prolong the time before a change of the membrane filter is required.

Apart from removing the membrane filters to clean them, there are a number of known physical methods for cleaning in vivo. These include chemical cleaning of the membrane filters in situ; backwashing or back pulsing using a liquid permeate or a gas to apply pressure from inside the membrane filters to release solids on the membrane surface; and membrane surface scouring or scrubbing using a gas in the form of bubbles in a liquid.

Backwashing is effective mainly with tubular membranes, such as hollow fibre membranes, as the applied pressure deforms other types of membranes including most flat sheet membranes.

Membrane surface scouring can be used on all types of membranes so is more common. This method uses gas bubbles to flow over the membrane surface to release the caked solids back into suspension in the membrane separation reactor and settle to the bottom as sludge. The sludge can then be removed by various means such as draining. A problem with the scouring method is that gas bubbles take a path of least resistance across the membrane surface as they rise. This can leave a considerable area of the membrane surface untouched by the gas bubbles and the filter cake intact in these areas.

A number of patent applications, such as U.S. 20090223895 and U.S. 20090026139, describe plates or sleeves placed adjacent hollow fibre membrane surfaces to maintain the scouring gas bubbles against at least a portion of the membranes. However, the gas bubbles may still take the path of least resistance as they rise across the membrane surfaces thereby leaving parts of the membrane surfaces unscoured.

Ndinisa et at (Separation Science and Technology, 41, 1383-1409, 2006) placed baffles adjacent both sides of a flat sheet membrane in the riser section in a tank to attempt to correct the uneven distribution of bubbles scouring the membrane surface. The baffles comprised small rectangular channels 1 cm wide and 7 mm deep. The channels did not extend along the baffle in a continuous fashion but were interrupted by strips to avoid baffle sway by the air bubbles.

Therefore, it is desired to overcome or reduce at least some of the above-described problems.

SUMMARY OF THE INVENTION

The present invention reduces the difficulties and disadvantages of the aforesaid designs by providing a guide member for directing gas bubble flow along a membrane surface for effective gas scouring.

From one aspect, the guide member is arranged to be placed adjacent a membrane surface and has first and second side edges defining a channel for gas bubbles to flow along, the channel having an open bottom end through which the gas bubbles can enter the channel and an open top end through which the bubbles can exit the channel, and a diverting means adjacent the channel bottom end arranged to direct at least some of the incident gas bubbles in a first direction towards the channel bottom end. The guide member can include at least one bar parallel to and between the first and second side edges to define at least another channel. By channel is meant a path, lane conduit, passage or the like, along which gas bubbles can flow in a controllable manner.

In this way, gas bubbles are directed to a channel or channels adjacent a membrane surface where the movement of the gas bubbles will be controlled along the channels. This provides path(s) for gas bubbles to flow along the entire membrane surface, or substantially all of the membrane surface, to scour the membrane surface. Preferably, the diverting means is also arranged to direct at least some of the incident gas bubbles in a second direction towards an adjacent membrane surface. A second guide member can be placed adjacent the adjacent membrane surface, in which case the gas bubbles directed in the second direction will be directed to an open channel bottom end of the second guide member to scour the adjacent membrane surface. When the guide member is placed between two opposing membrane surfaces (e.g. belonging to two adjacent membrane modules), a gas bubble flowing along the guide member channel(s) will be in contact with and will scour both of the opposing membrane surfaces. The channel(s) is/are preferably open adjacent the membrane surface so that the bubbles traveling along the channel(s) are in contact with the membrane surface.

In this way, gas bubbles flowing along a channel or channels of one guide member can scour two oppositely facing membrane surfaces.

Advantageously, the diverting means is arranged to impart different velocities on the gas bubbles directed in the first and second directions. When gas bubbles having different velocities meet, their chances of merging to form a larger gas bubble or preferably a slug bubble is enhanced. Therefore, gas bubbles of different velocities from adjacent guide members can meet to form slug bubbles which flow along the channel(s) to scour the membrane surface(s). It is thought that slug bubbles flowing, against the membrane surface will create a 'Taylor Effect' to efficiently remove debris from the membrane surface.

In one embodiment, the diverting means has a first arm for directing the incident gas bubbles in the first direction and a second arm for directing the incident gas bubbles in the second direction, the first and second arms being in a substantially "V" shaped configuration. The arms can extend from a bar extending between the first and second side edges to give the bar a "V" shaped profile. Gas bubbles incident on the point at which the first and second arms meet will be directed along either one of the arms in the first or second direction.

Advantageously, the first and second arms have different configurations to impart different velocities on the gas bubbles. Preferably, the first arm is longer than the second arm and has a direction change such as a bend in it.

In a preferred embodiment, the channel or channels are about 10 cm wide, although the channel width(s) can be more or less than 10 cm.

Advantageously, the guide member further comprises an attachment means for detachably attaching the guide member to a housing, to another guide member or to a membrane module. The attachment means comprises at least one tab extending from the second side edge, the tab having an opening. In one embodiment, the attachment means comprises two tabs, each tab having an opening and extending from and spaced along the second side edge. The opening(s) are arranged to receive a bar or a rod which can also extend through corresponding attachment means in the housing or the other guide member or the membrane module. Alternatively, the attachment means can be of any other suitable form such as a bar which extends through openings in the housing or membrane module. This means that the guide member can be easily attached and detached from a membrane module, housing or another guide member for ease of assembly and disassembly.

From another aspect, there is provided a membrane module assembly for treating water, the membrane module assembly comprising at least one guide member as defined above, and at least one membrane module having at least one membrane surface, the membrane module being sized and shaped to be placed adjacent the guide member in use so that the channel is adjacent the membrane surface. The membrane modules and the guide members can be stacked together to form a membrane module assembly. The membrane module assembly can be considered as a 'cassette' which can be used or retrofitted in any type of bioreactor.

Preferably, the membrane module has two membrane surfaces, one on each side of a backing plate. These are referred to herein as "adjacent" membrane surfaces. The backing plate can include support struts for further supporting the membrane surfaces or spacers for spacing the membrane surfaces from the backing plate. The membrane module has at least one effluent outlet on a first side edge and a manifold connectable to the at least one effluent outlet.

Advantageously, the membrane module comprises an attachment means for detachably attaching the membrane module to the guide member, to a housing or to other membrane modules. The attachment means can comprise at least one tab having an opening extending from a second side edge of the membrane module. The membrane module is detachably attachable to a housing or to the guide member by a bar or a rod extending through the opening of the attachment means and a corresponding hole in an attachment means of the housing or the guide member or the other membrane module.

From a further aspect, there is provided a membrane module assembly for treating water, the membrane module assembly comprising first and second membrane modules having oppositely facing membrane surfaces, separated by a guide member as defined above, wherein the channel(s) of the guide member is/are adjacent both of the oppositely facing membrane surfaces and the guide member diverts gas bubbles to both of the oppositely facing membrane surfaces or to an adjacent membrane surface. Advantageously, the membrane module comprises an attachment means for detachably attaching the membrane module to the guide member, to a housing or to another membrane module. Preferably, each membrane module has two membrane surfaces, one on each side of a backing plate ("adjacent" membrane surfaces). The backing plate can include support struts for further supporting the membrane surfaces or spacers for spacing the membrane surfaces from the backing plate. The membrane module has at least one effluent outlet on a first side edge and a manifold connectable to the at least one effluent outlet. The attachment means can comprise at least one tab, having an opening, extending from a second side edge of the membrane module, the membrane module being attachable to a housing, to the guide member or to another membrane module by a bar or a rod extending through the opening of the attachment means and a corresponding hole in an attachment means of the housing, guide member or another membrane module.

From a yet further aspect, there is provided a membrane filter system for treating water, the membrane filter system comprising: a membrane module assembly as defined above and a diffuser for supplying gas bubbles to the membrane module assembly. Preferably, the diffuser is positioned beneath the membrane module assembly in use.

From another aspect, there is provided a method for gas scouring a membrane surface, the method comprising: providing a flow of gas bubbles; and directing at least some of the gas bubbles towards an open bottom end of a channel of a guide member adjacent the first membrane surface using a diverting means of the guide member.

The method can also comprise providing a second membrane surface adjacent the first membrane surface; and directing at least some of the gas bubbles towards the second membrane surface. A second guide member can be provided adjacent the second membrane surface in which case at least some of the gas bubbles are directed towards the second guide member.

Advantageously, the method can further comprise imparting a different velocity on the gas bubbles directed to the first and second membrane surfaces. When gas bubbles with different velocities meet, their chances of joining to form a larger bubble or a slug bubble is enhanced. Slug bubbles are thought to have an effective cleaning effect on a membrane surface against which they flow.

By means of embodiments of the invention, a guide member can be placed adjacent and touching a membrane surface to provide a path or paths for gas bubbles to flow along and scour. An array or stack of membrane modules separated by guide members can be provided whereby the channel(s) of each guide member can guide the movement of gas bubbles across two adjacent and oppositely facing membrane surfaces. The diverting means of the guide member can impart different velocities on incident gas bubbles. Therefore, at each channel bottom end there will be gas bubbles with different velocities which will meet to form slug bubbles within the channel(s). As the channel(s) cover the entire, or practically the entire, membrane surface, the gas bubbles will scour and clean the entire, or practically the entire, membrane surface. This will increase the useful period of a membrane surface and reduce the frequency of maintenance and repair thereby reducing operating costs and minimizing costs. The guide member also provides support to the membrane surface to allow backwashing. Regular backwashing can help maintain the membrane surface free of debris and minimize downtime where the membrane surface must be removed and cleaned.

BRIEF DESCRIPTION OF THE DRAWINGS

Further aspects and advantages of the present invention will become better understood with reference to the description in association with the following in which.

DETAILED DESCRIPTION OF THE INVENTION

Figure 1:
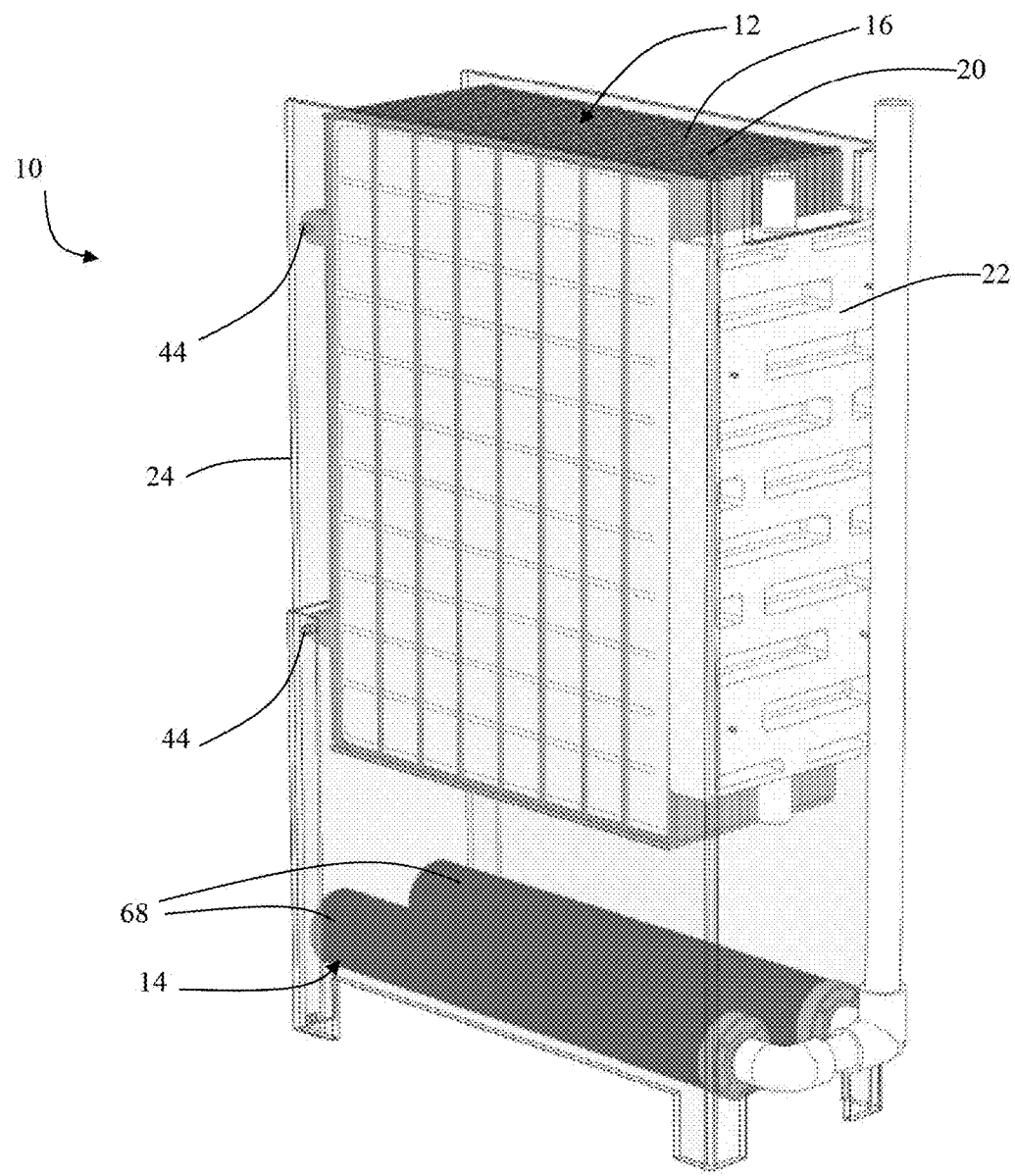
FIG. 1 is a perspective view of a membrane filter system according to an embodiment of the present invention having a membrane module assembly including membrane modules, guide members and a manifold, and an aeration system.
Figure 2:
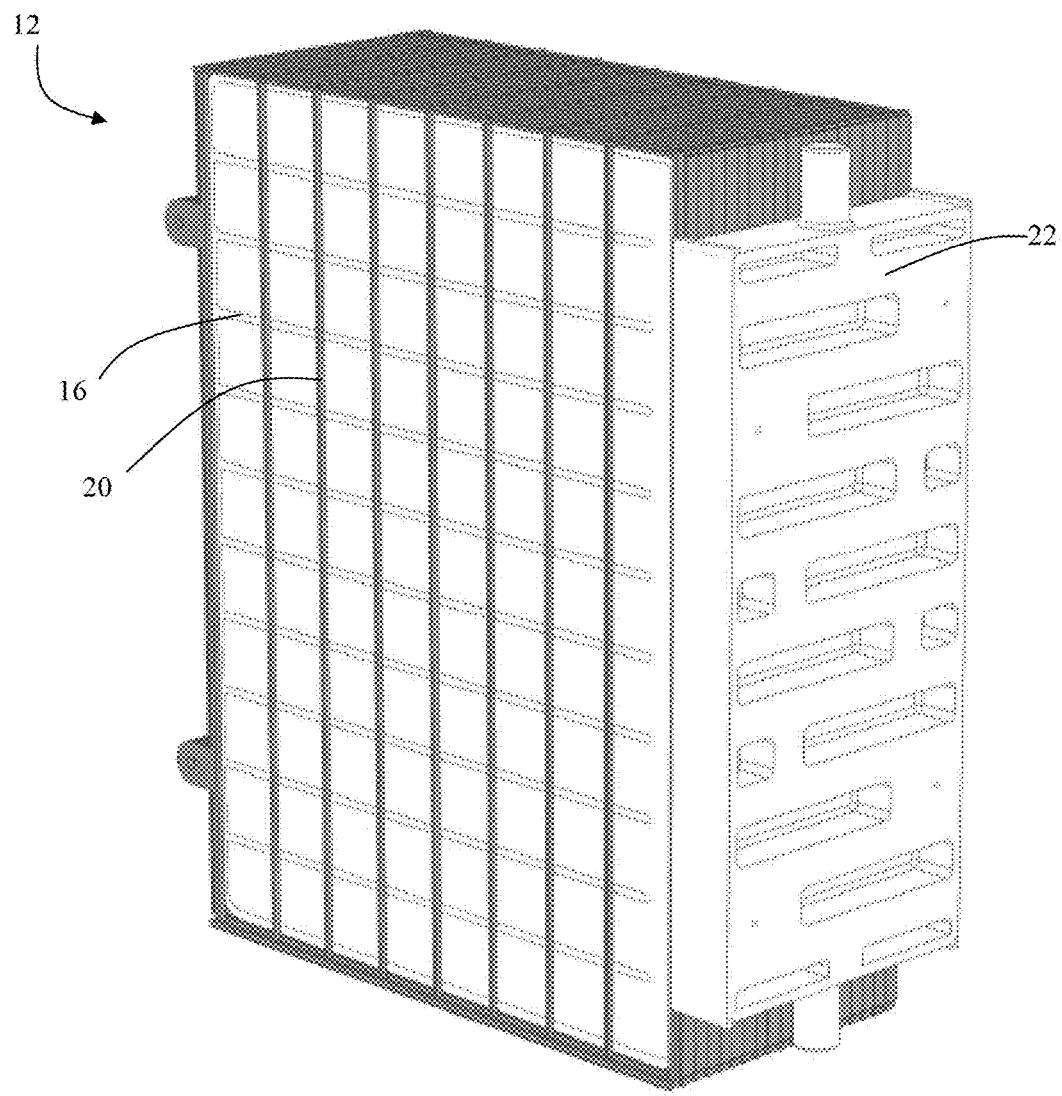
FIG. 2 is a perspective view of the membrane module assembly of FIG. 1.
Figure 3:
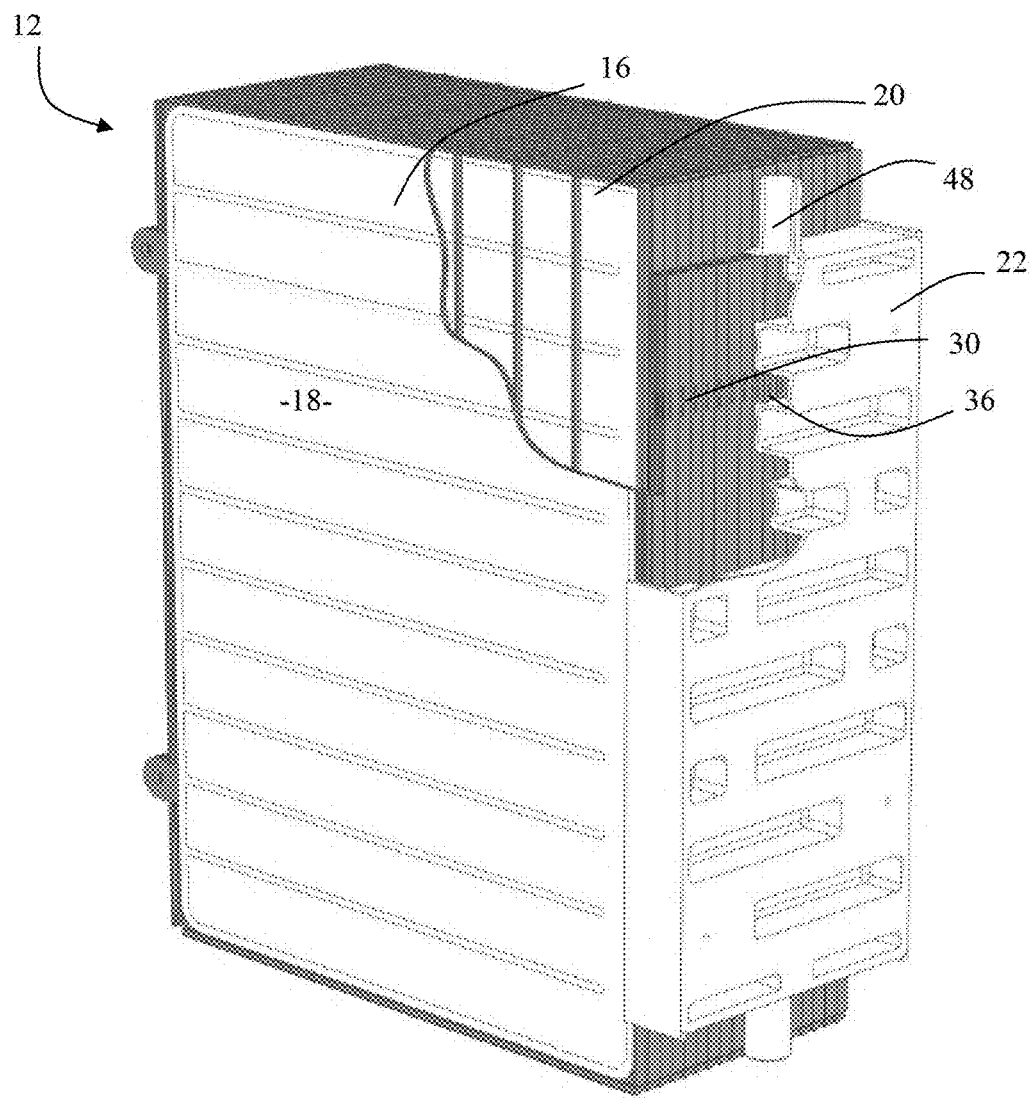
FIG. 3 is a perspective view of the membrane module assembly of FIG. 2 with a portion of the manifold and a portion of an outside membrane module cut away for clarity.
Figure 4:
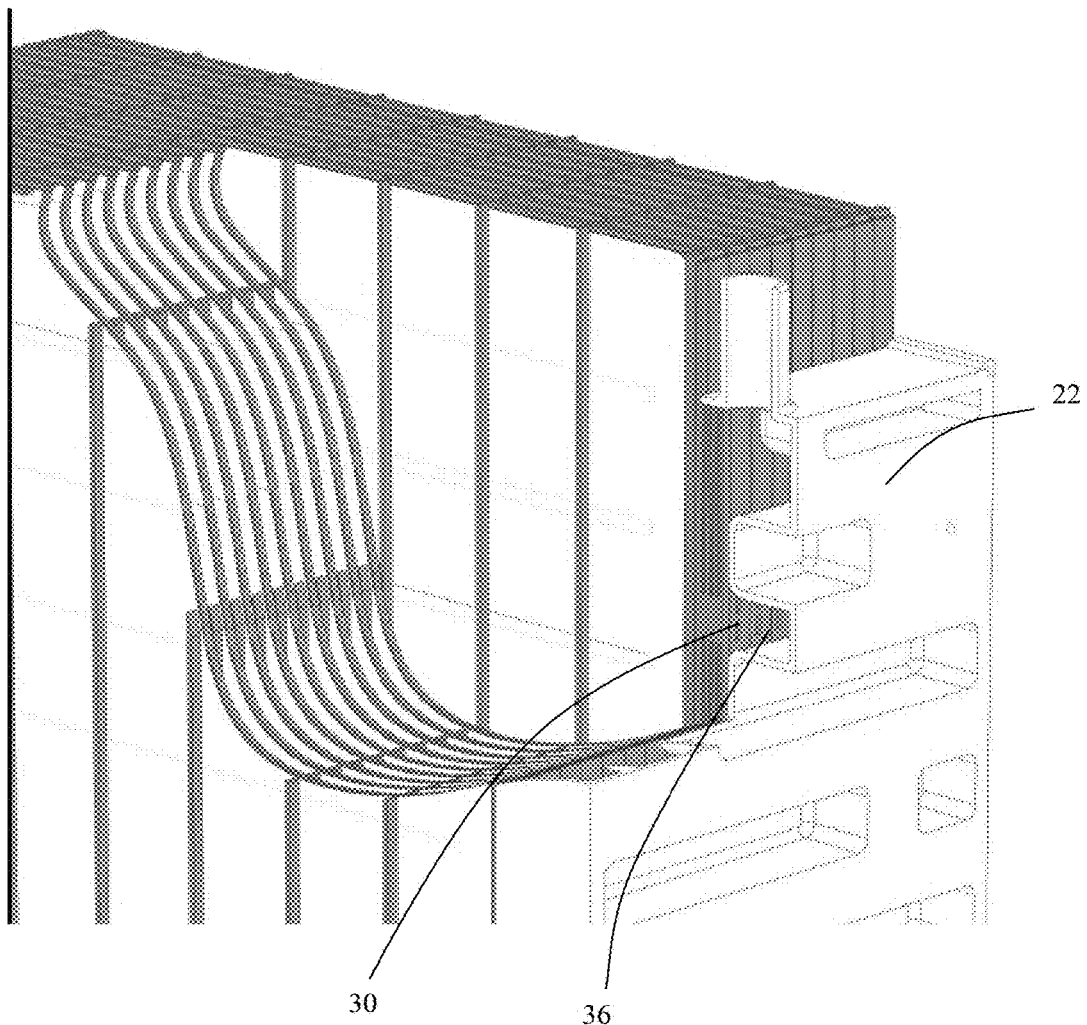
FIG. 4 is an enlarged view of the membrane module assembly of FIG. 2, with parts removed for clarity.
Figure 5:
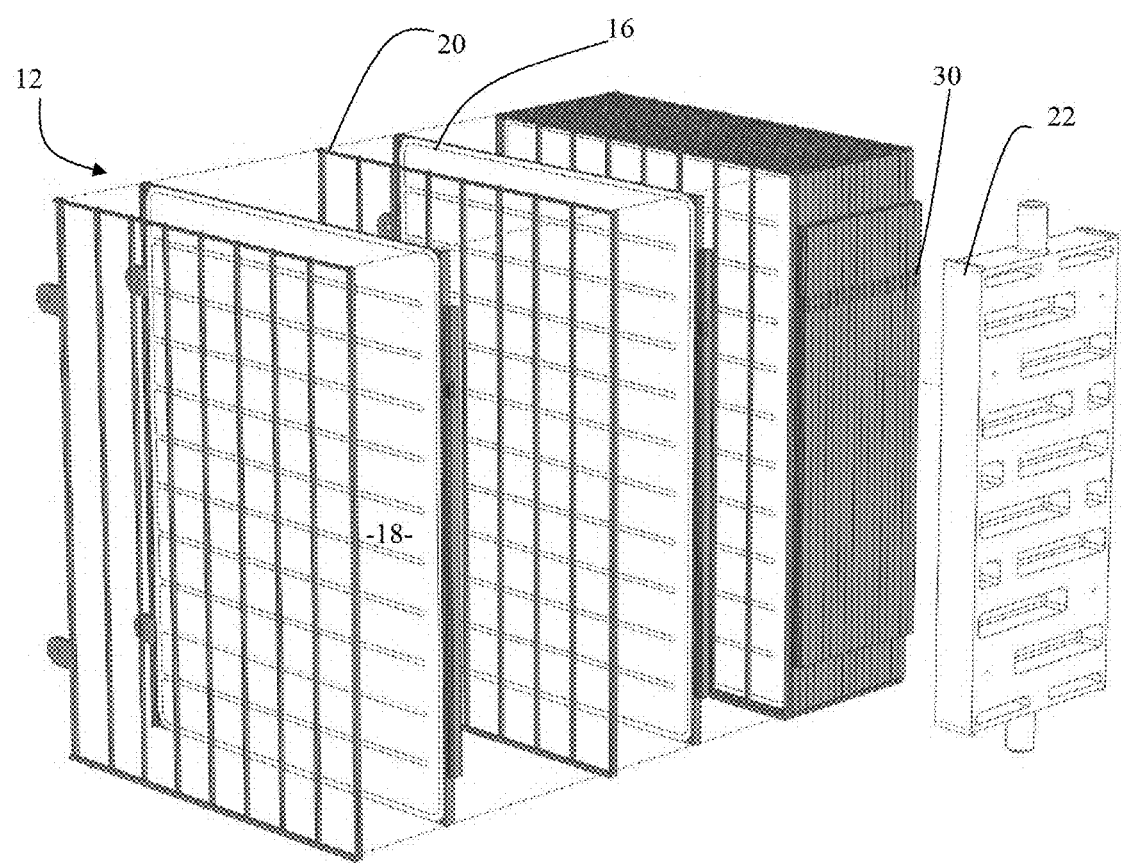
FIG. 5 is an exploded view of the membrane module assembly of FIG. 1.
Figure 6:
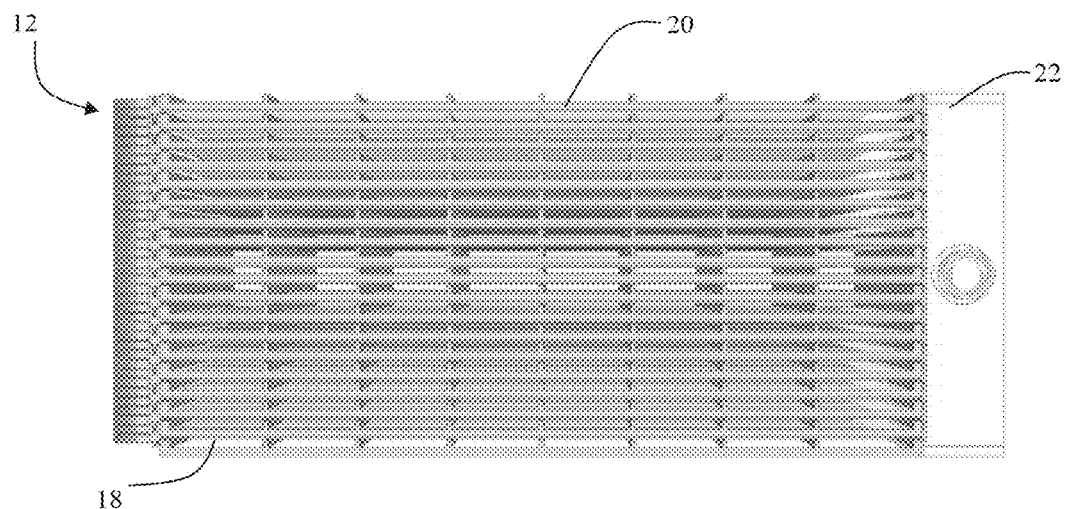
FIG. 6 is a top perspective view of the membrane module assembly of FIG. 1.
Figure 7:
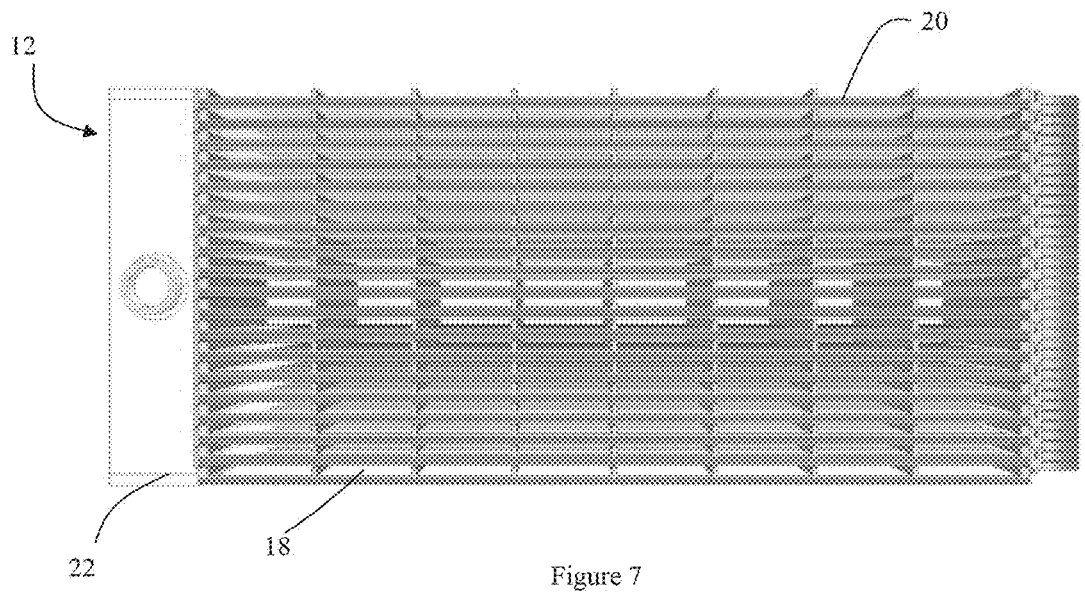
FIG. 7 is a bottom plan view of the membrane module assembly of FIG. 1.
Figure 8:
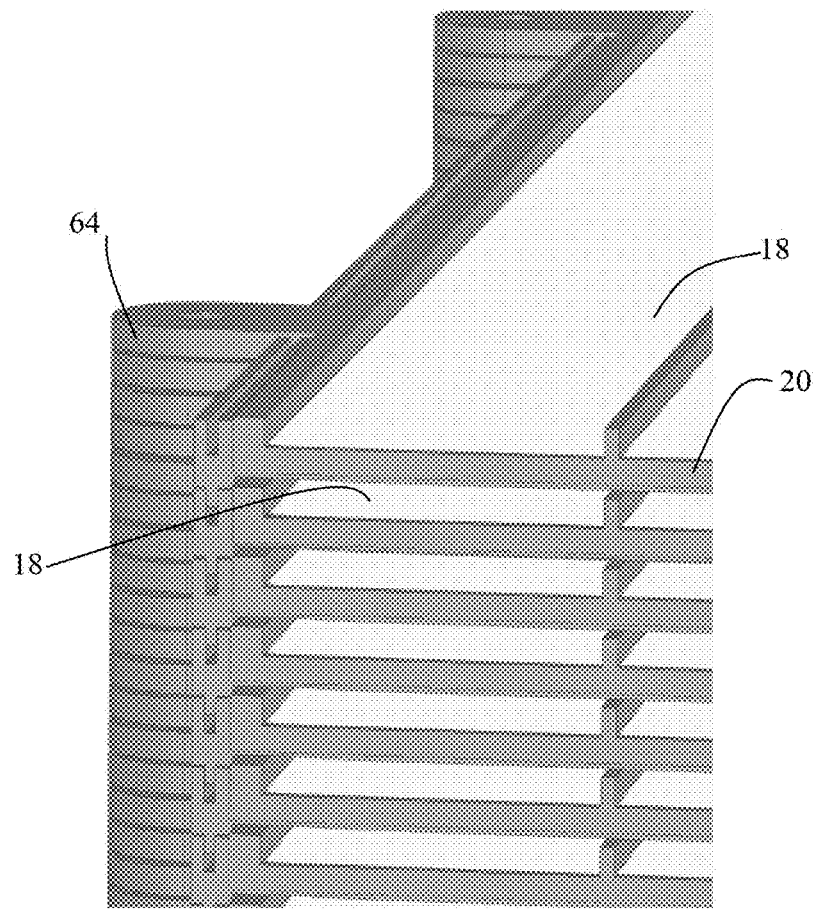
FIG. 8 is a perspective enlarged view from a top edge of a second side edge of the membrane module assembly of FIG. 1.
Figure 9:
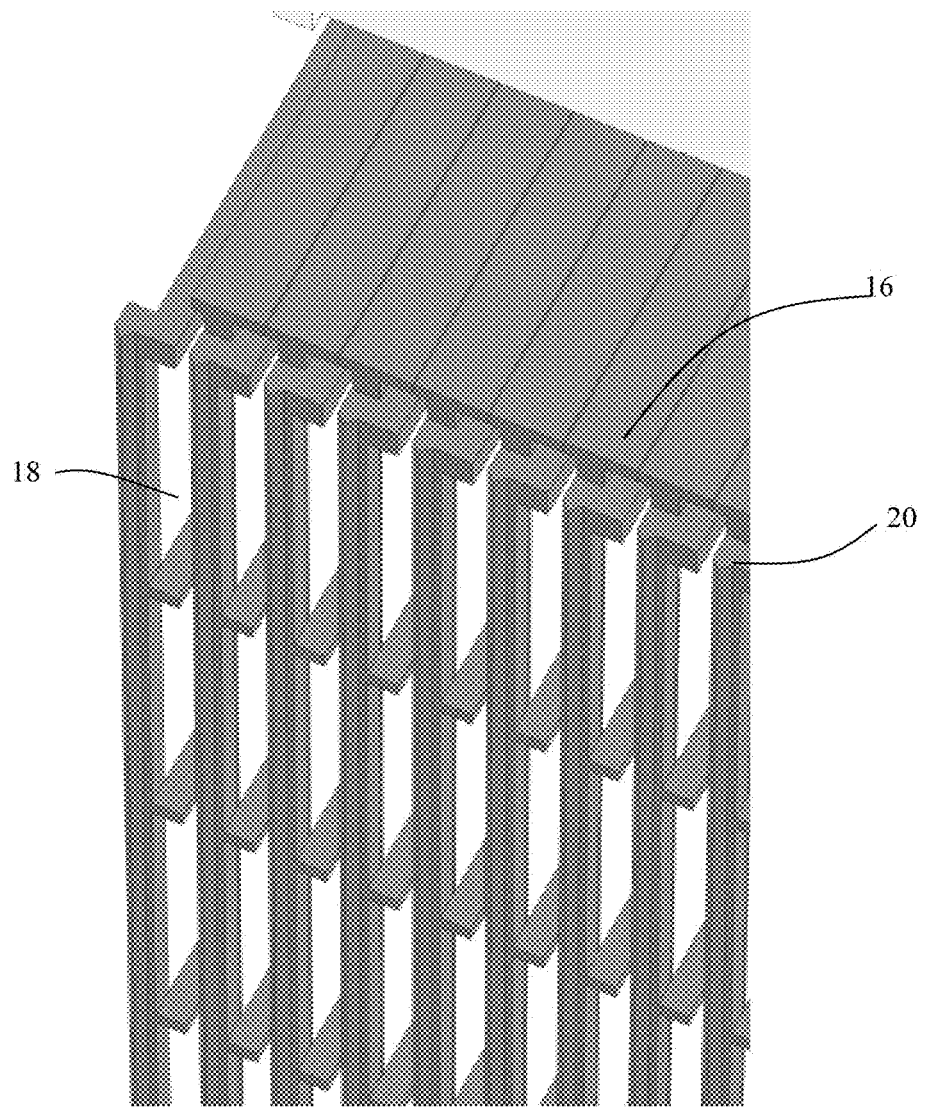
FIG. 9 is an enlarged view from a bottom edge of a first side edge of the membrane module assembly of FIG. 1.
Figure 10:
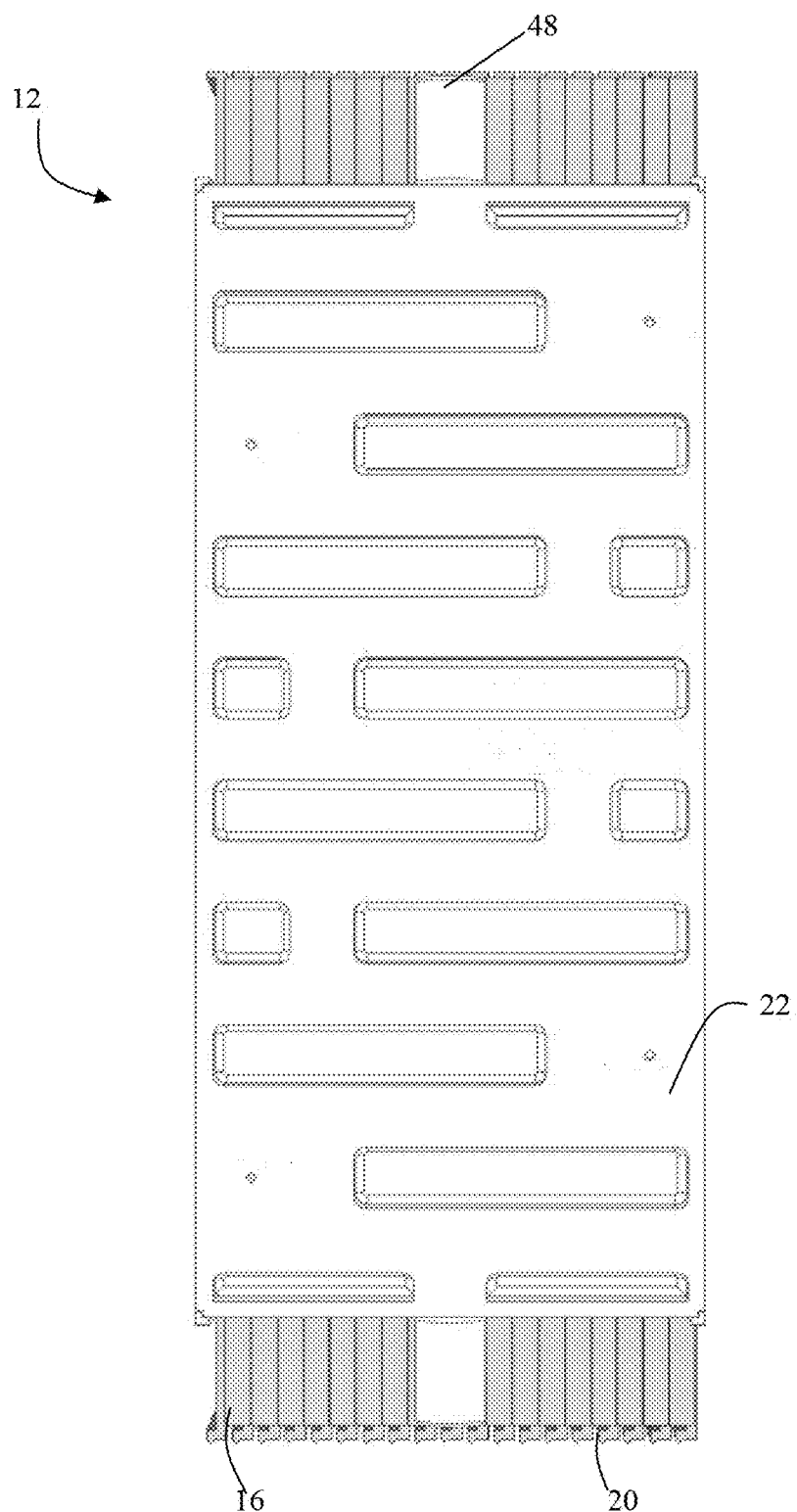
FIG. 10 is a side view of the membrane module assembly of FIG. 1 showing the manifold in plan view.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items.

With reference to FIG. 1, a membrane filter system according to one embodiment of the present invention is generally illustrated at 10. The membrane filter system 10 broadly comprises a membrane module assembly 12 for treating water such as wastewater and a gas bubble generation (aeration) system 14 for producing gas bubbles and supplying them to the membrane module assembly 12 for removing and preventing solid debris accumulation. The membrane module assembly 12 is positioned above the aeration system 14. The system 12 may comprise multiple membrane module assemblies 12.

Referring now to FIGS. 1 to 10, the membrane module assembly 12 comprises membrane modules 16 having membrane surfaces 18 for filtering the water to be treated ("feed water" or "influent"), interleaved between guide members 20 for guiding the direction of gas bubbles across the membrane surfaces, and a manifold 22 for drawing filtered liquid ("effluent" or "permeate") from the membrane modules 16. In use, the membrane module assembly 12 is immersed in the water to be treated, such as within a bioreactor (not shown) or a similar container of water to be treated. The membrane filter system 10 may include a housing 24 to which the membrane module assembly 12 is connectable and which can be submerged in the bioreactor or other container. Gas bubbles are generated by the aeration system 14 which rise to the membrane module assembly 12 and are guided along the faces of the membrane modules 16 by the guide members 20 to scour the membrane surfaces 18 of debris and prevent further fouling.

Figure 22:
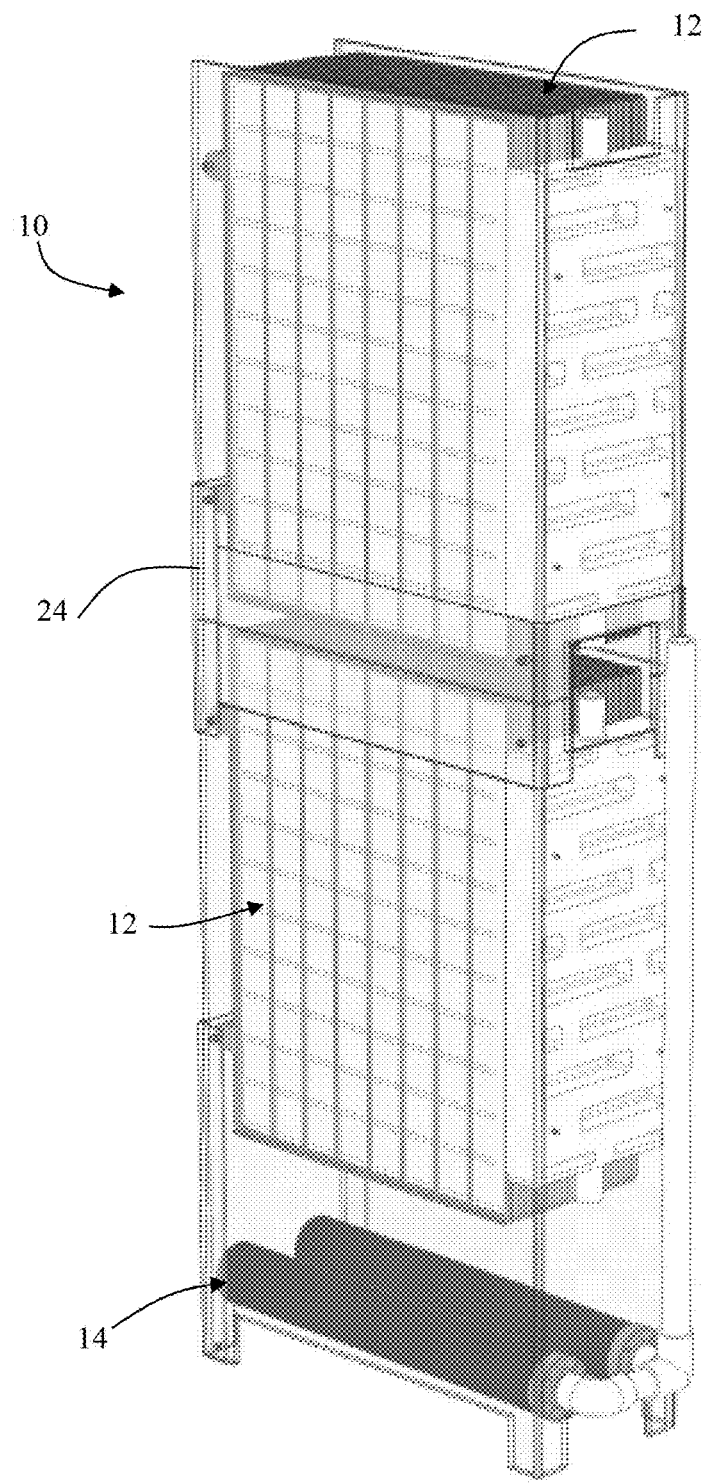
FIG. 22 is a perspective view of a membrane filter system according to another embodiment of the present invention having two stacked membrane module assemblies and an aeration system.

The membrane module assembly 12 comprises a stack of membrane modules 16 and guide members 20 where the membrane modules 16 are separated from one another by the guide members 20. To this end, the guide members 20 are of similar dimensions to the membrane modules 16. When assembled, the membrane modules 16 are arranged at the same orientation as each other and such that the membrane surfaces 18 of each membrane module 16 are substantially parallel to one another. The membrane module assembly 12 may comprise a single membrane module 16 and a single guide member 20, or a single membrane module 16 and two guide members 20 (one on either side of the membrane module 16), and multiples thereof. Membrane module assemblies 12 may be stacked one on top of another, above the aeration system 14 (FIG. 22), or in any other configuration.

The guide members 20 and membrane modules 16 are relatively fixed in relation to one another, when assembled, in a manner that will be described later. The illustrated embodiment of the invention has 19 guide members 20 and 19 membrane modules 16, although the invention can have more or less membrane modules 16 and guide members 20.

Figure 11:
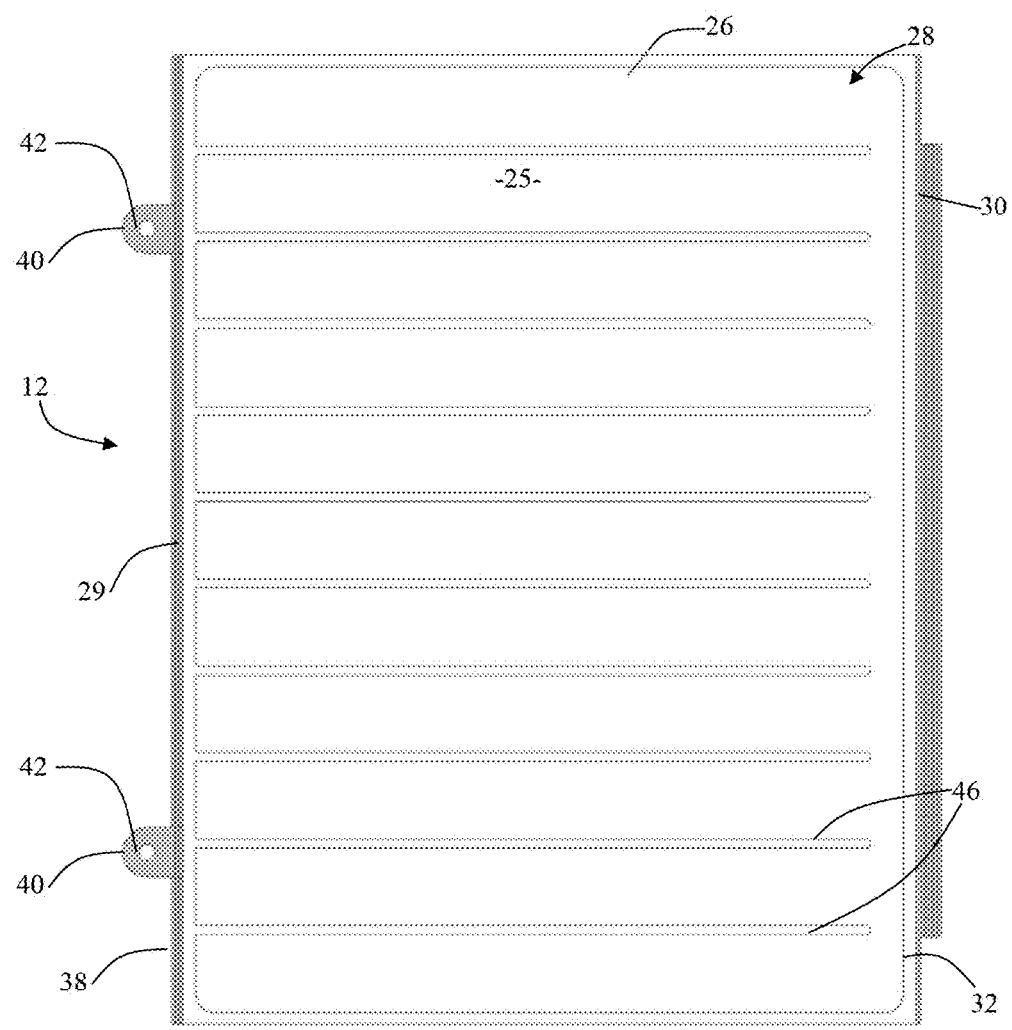
FIG. 11 is a front plan view of the membrane module of FIG. 1.
Figure 12:
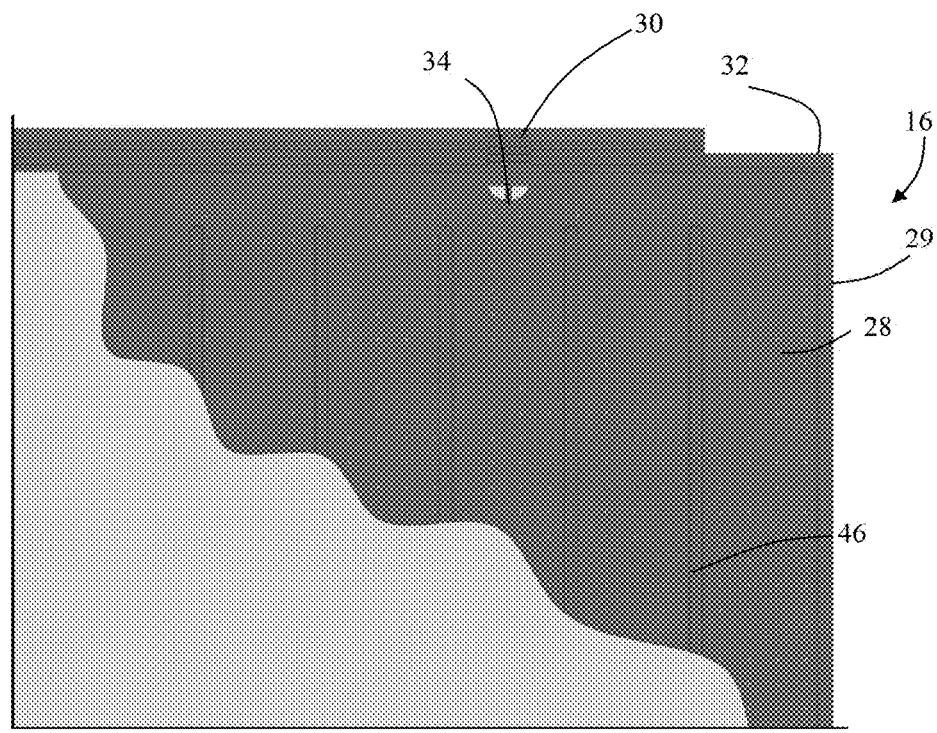
FIG. 12 is an enlarged plan view of a portion of the membrane module of FIG. 11 with a portion of a membrane surface removed for clarity.

Referring to FIGS. 11 and 12, each membrane module 16 is substantially rectangular and comprises first and second oppositely facing ('opposing') flat sheet membranes 25, 26 attached to either side of a backing plate 28. The first and second membranes 25, 26 define the porous membrane surfaces 18 through which the water to be treated will be filtered. A membrane module outlet 30 is provided at a first side edge 32 of the membrane module 16 through which the filtered water ("effluent" or "permeate") is drawn and can be collected, for example by applying a pressure differential across the membrane module 16. The outlet 30 is in the form of a pair of slits (best seen in FIGS. 3 to 5). An opening 34 is provided in the backing plate 28 which is in fluid communication with the membrane module outlet 30. The membrane module outlet 30 communicates with a corresponding opening 36 within the manifold 22 (best seen in FIGS. 3 and 4). Additional manifold openings 36 may be provided in the manifold, as illustrated. The backing plate opening 34 has a central support bar for ease of manufacturing and minimization of the distortion of the opening during manufacturing.

Figure 13:
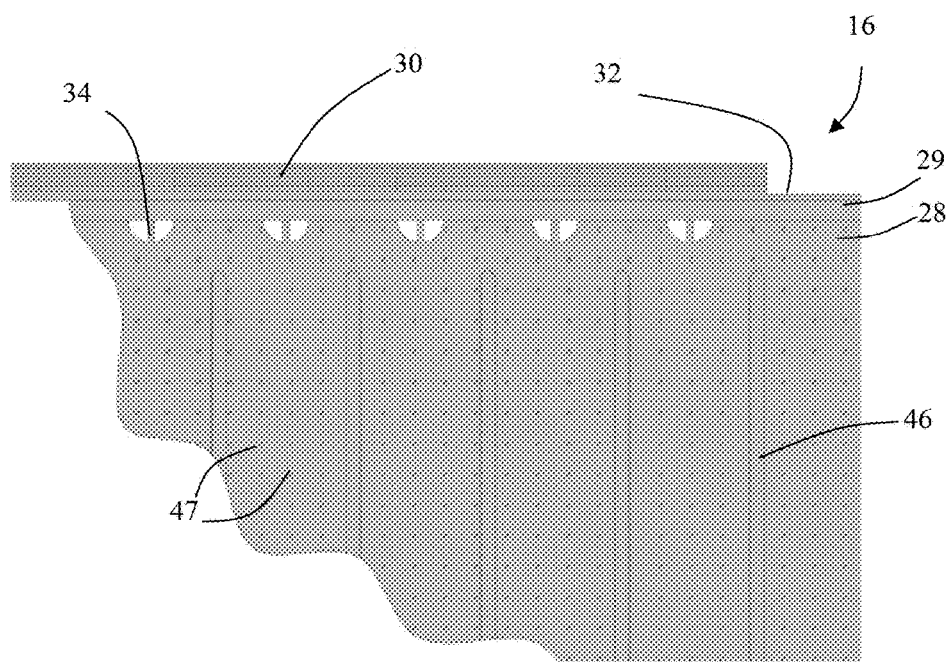
FIG. 13 is an enlarged plan view of a portion of a membrane module according to another embodiment, with a portion of a membrane surface removed for clarity.
Figure 14:
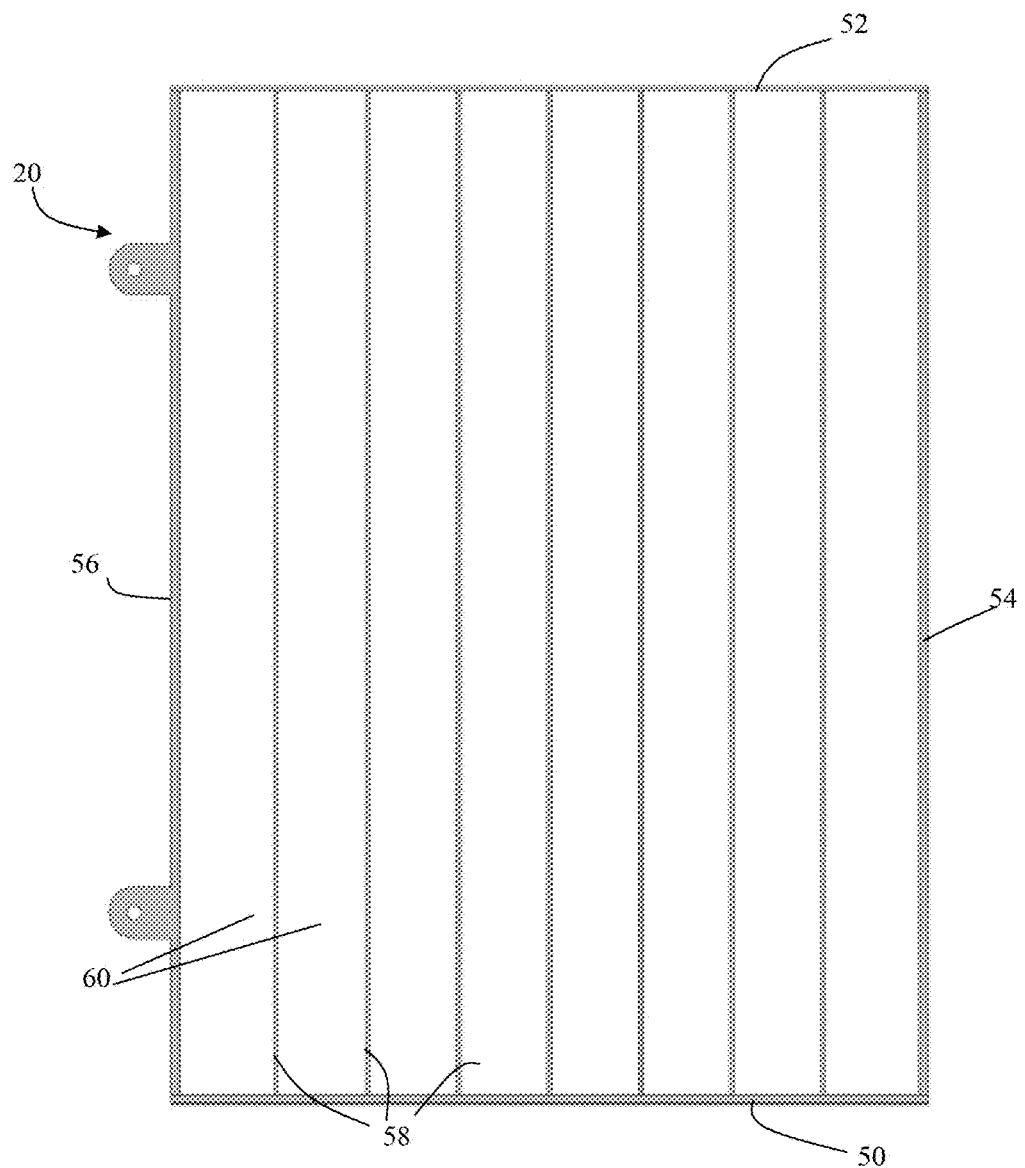
FIG. 14 is a front plan view of the guide member of FIG. 1.
Figure 15:
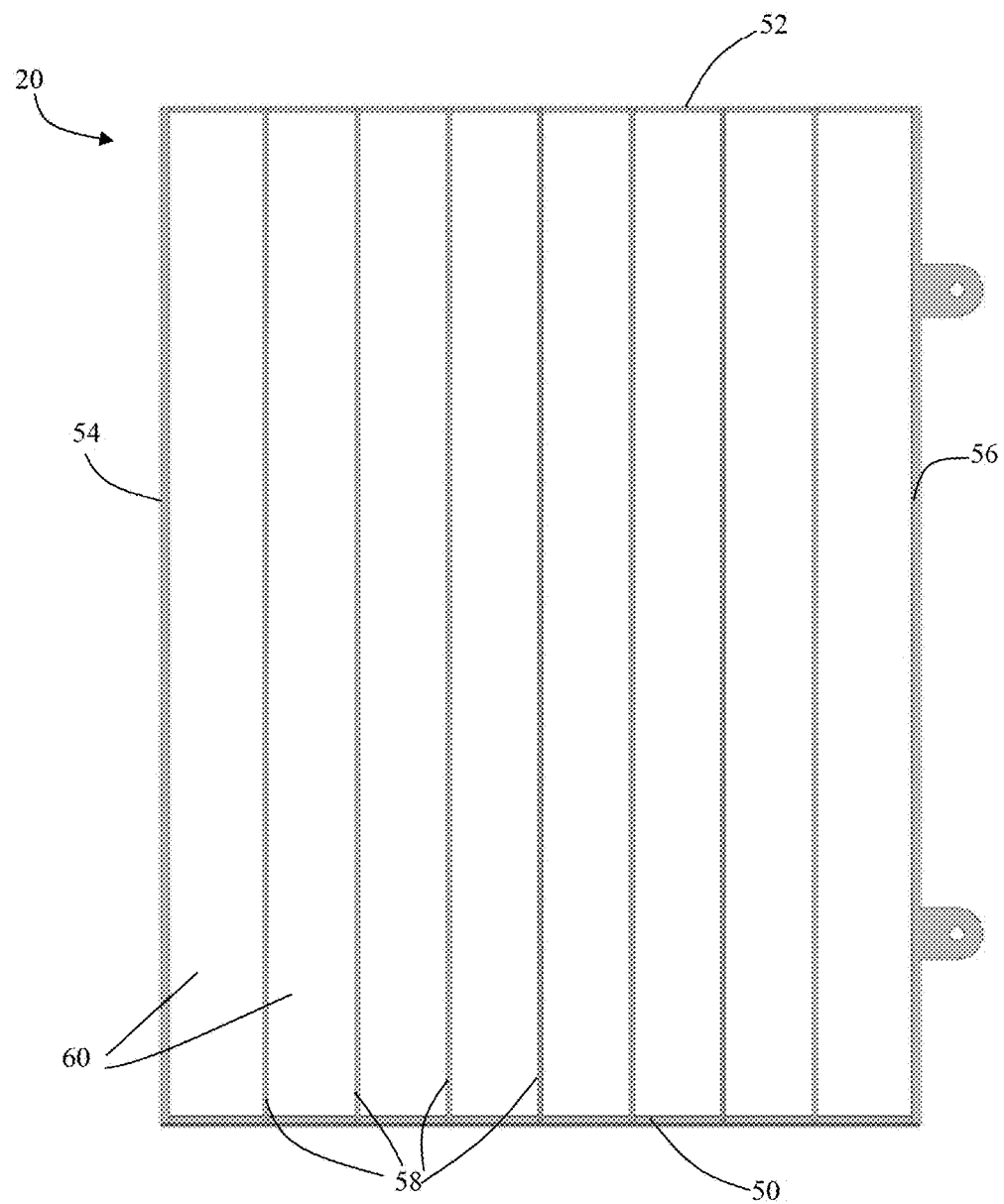
FIG. 15 is a back plan view of the guide member of FIG. 1.
Figure 16:
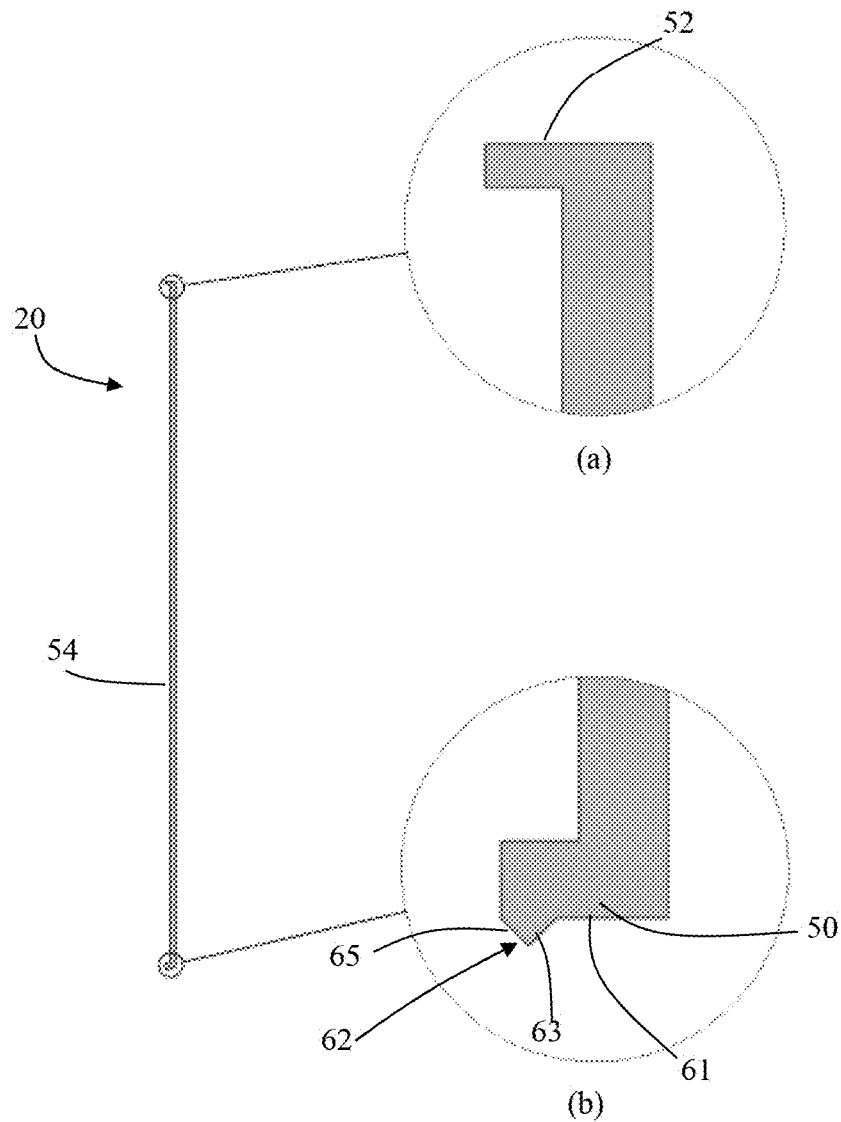
FIG. 16 is a view of the guide member of FIG. 1 from a first side edge and showing an enlargement of the (a) top and (b) bottom ends.
Figure 17:
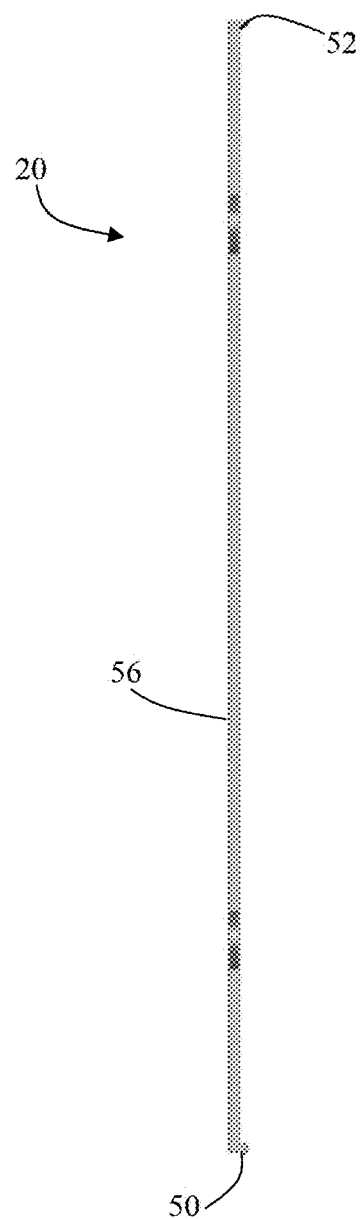
FIG. 17 is a view of the guide member of FIG. 1 from a second side edge.
Figure 18:
FIG. 18 is a top plan view of the guide member of FIG. 1.
Figure 19:
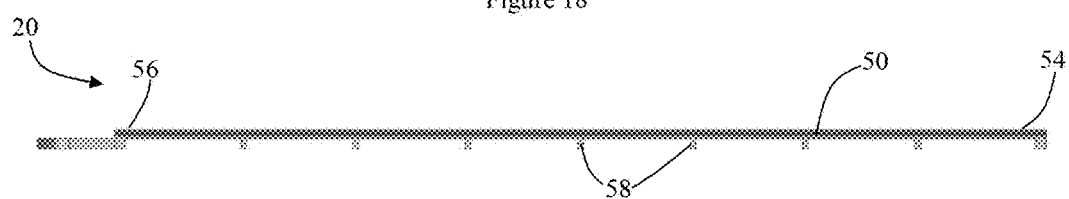
FIG. 19 is a bottom plan view of the guide member of FIG. 1.
Figure 20:
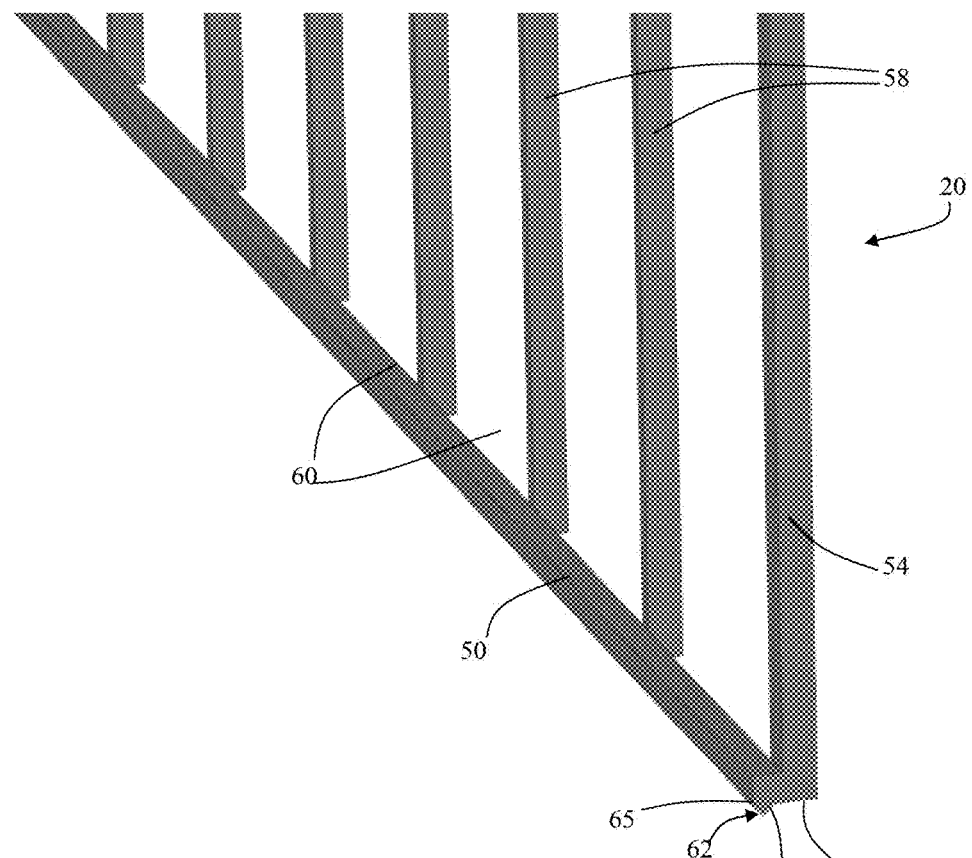
FIG. 20 is a perspective view along the bottom edge from a first side of the guide member of FIG. 1.

It will be appreciated that the backing plate opening 34 can be any other shape, size or number. For example, multiple backing plate openings can be provided (as illustrated in FIG. 13). In this case, a plurality of corresponding membrane module outlets 30 can also be provided which will correspond to the plurality of manifold openings 36.

The backing plate 28 has a raised periphery in the form of frame 29 on both sides and at least one raised support structure or strut 46 extending from one or both of the side edges towards the oppositely facing side edge. The backing plate 28 also includes protrusions (spacers) 47 or dimples extending as an array from the backing plate for preventing the inward collapse of the membranes 25, 26 towards the backing plate. Effectively, the protrusions 47 help to space the oppositely facing membranes 25, 26 from the backing plate 28. The protrusions are preferably cone shaped with a rounded tip. The rounded tip will contact the membrane surfaces 25, 26 when the membrane module 16 is assembled. It will be appreciated that the support struts 46 and the protrusions 47 are optional.

On a second side edge 38 of the membrane module 16 is an attachment means for attaching the membrane module 16 to the guide member 20 or to another membrane module 16 to form the membrane module assembly 12. In this embodiment, the attachment means is at least one arm or tab 40, preferably two, extending from the second side edge 38 of the membrane module 12 and spaced from one another along the second edge. Each tab 40 has an opening 42 for receiving a bar or a rod or a bolt 44 (FIG. 1) which will also pass through similar attachment means in adjacent membrane modules and guide members to form the membrane module assembly 12. The bar 44 can also be attached to the housing 24 to secure the membrane module assembly 12 to the housing 24. Alternatively, the guide plates 20 or the membrane modules 16 can be connected to each other or the housing 24 in any other way such as by welding or gluing although it is of course more advantageous to use removable attachment means such as the illustrated tab and bar arrangement, amongst others.

The flat sheet membranes 25, 26 can be of any suitable material or pore size for the influent being treated. For example, the pore size may range from nano- to ultra-sizes. In one embodiment, the pore size is 0.04 μm and the flat sheet membrane is made from polysulfone or polyethersulfone. The backing plate 28 is made of a rigid material such as a polymer e.g. a polypropylene blend. The backing plate 28 can be made by moulding (e.g. injection moulding) or any other suitable method. The backing plate including the frames 29, the support struts 46, the protrusions 47 and the opening 34 are preferably integral and moulded as a single piece. Alternatively, they can be made separately and joined together. The membranes 25, 26 can be attached to the backing plate 28 using adhesive, ultrasound or welding. In a preferred embodiment, the membranes 25, 26 are welded or glued to the frames 29 and the support struts 46 of the backing plate 28 by laser and a suitable pressure applied.

The manifold 22, also known as a 'suction room' in the art, comprises a chamber having a number of manifold openings 36 for engagement with the outlet opening 34 of the membrane modules 16. The manifold openings 36 define a tortuous path in the chamber leading to a manifold outlet 48 through which the effluent is drawn. Alternatively, a single manifold opening 36 may be provided. Upstream of the manifold 22 may be provided a two-way valve (not shown) for effecting backwashing of the membrane modules 16. When closed, this valve will allow pressure to be applied on the membrane module from the permeate side to the feed side for effecting a backwash. Advantageously, the guide members 20 provide structural support to the membrane sheets 25, 26 allowing them to physically survive a backwash. Normally, flat membranes cannot withstand backwashing unless supported. The manifold 22 also provides structural support to the membrane modules 16.

Turning now to the guide members 20 illustrated in FIGS. 14 to 20, each guide member 20 is a substantially rectangular frame having a bottom edge 50, a top edge 52 and first and second side edges 54, 56. Bars 58 extend between the bottom and top edges 50, 52 to define channels 60 or passages for guiding the movement of gas bubbles. The channels 60 are the spaces between the bars 58 and provide a path or course for the gas bubbles to flow along. The channels 60 are uninterrupted paths or conduits for the gas bubbles to flow along. The bars 58 are parallel to one another and to the side edges 54, 56. The bottom and top edges 50, 52 lie on a different plane to the bars 58 and the side edges 54, 56. The side edges 54, 56 can also be considered as bars 58. The bars 58 are connected to one side of the top and bottom edges 50, 52 (i.e. off-set) so that air bubbles can move unhindered along the channels 60 (best seen in FIG. 20). In other words, the channels are open ended (at the top and bottom edges). This allows gas bubbles to enter and leave the channels 60 at the bottom and top edges, respectively, whilst the bars 58 ensure that the gas bubbles remain within the channels 60 until they reach the top edge 52 where they can exit the guide member 20.

The bottom edge 50 is profiled to direct the gas bubbles to either side of the guide member 20 with different velocities in order to enable the creation of slug bubbles and to maximize slug bubble size. The profiled bottom edge 50 may also help to minimize turbulence at the guide member bottom edge 50. In this embodiment, the bottom edge has a "V" shaped wedge 62 extending from the bottom edge 50 away from the guide member 20 to further direct the gas bubbles towards either side of the guide member 20. The "V" shaped wedge 62 is not centred on the bottom edge 50 when viewed from the side (see FIGS. 16, 20 and 21) but is spaced away from the side edges 54, 56. This non-symmetry will impart different velocities on the gas bubbles incident on the different sides of the wedge. Therefore, the profile of the bottom edge comprises a flat portion 61 adjacent a first angled portion 63 (a first arm) which is angled towards the bars 58, which is adjacent a second angled portion 65 (a second arm) which is angled away from the bars 58.

It will be appreciated that the guide member 20 can be used adjacent any type of membrane or flat sheet membrane. Its use is not limited to the membrane module 16 described herein.

Figure 21:
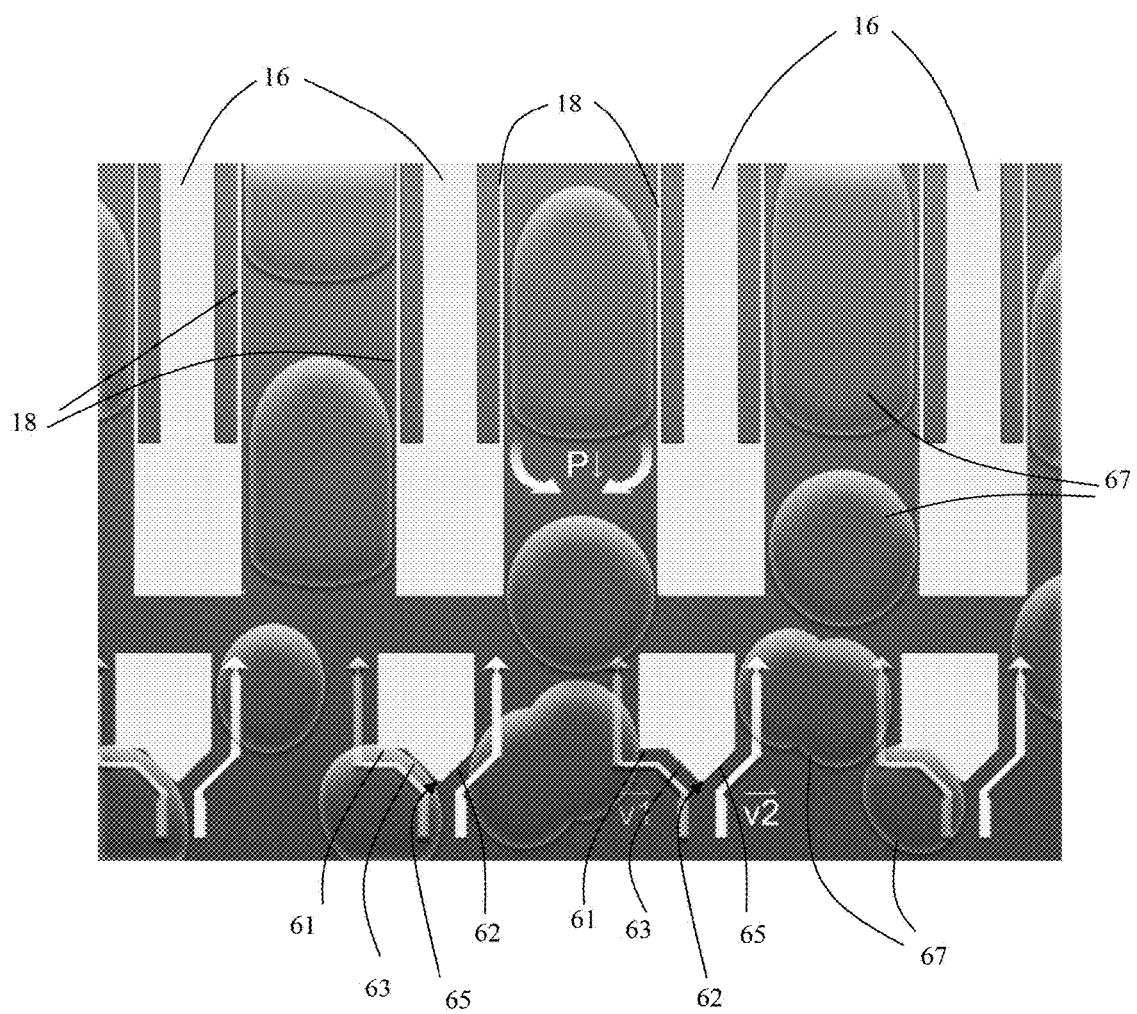
FIG. 21 is a schematic illustrating the guide member of FIG. 1 in use.

In use, as illustrated in FIG. 21, gas bubbles 67 rising at the same speed from beneath the guide member 20 will be guided along either the first angled portion 63 or the second angled portion 65 of the wedge 62 of the guide member 20. Those guided by the first angled portion 63 will travel along the slope of the first angled portion 63 until they reach the flat portion 61 where they will change direction at least twice and enter the channels 60 in which they will travel upwardly whilst scouring the membrane surface 18 of the membrane module 16. Those gas bubbles 67 guided by the second angled portion 65 will travel along the slope of the second angled portion 65 and flow upwardly against the adjacent membrane surface 18 of the same membrane module 16 within the channels 60 of the adjacent guide member 20. The gas bubbles between two membrane modules 16 will scour the oppositely facing membrane surfaces 18 of both membrane modules 16 as the channels are open sided. It will be appreciated that the gas bubbles incident against the first and second angled portions will have different speeds, v1 and v2 respectively, due to the different distances travelled and changes in direction. When two bubbles with different velocities meet, their collision likely causes them to join together and rise in the channels 60 as a slug bubble which can result in a Taylor effect of cleaning the membrane surfaces 18. This is thought to result in an efficient scouring of the membrane surfaces 18. The chances of two gas bubbles merging together on collision is enhanced by imparting different velocities to the gas bubbles. It is thought that gas bubbles larger than the channel width will break up or deform to fit into the channel. Gas bubbles smaller than the channel width will flow upwardly in the channel.

The top and bottom edges 52, 50 of the guide member 20 are sized and shaped to receive the membrane module 16 in use so that the membrane module 16 and the guide member 20 are touching when assembled. A top edge of the membrane module 16 rests against the top edge 52 of the guide member 20 and a bottom edge of the membrane module 16 rests against the bottom edge 50 of the guide member 20. The bars 60 touch and extend along one of the membrane surfaces 18 of the membrane module 16. This arrangement enhances the mechanical properties of the membrane modules 16 and provides structural support to the membrane sheets 25, 26 such as during backwashing. In fact, in the assembled membrane module assembly 12 of the present invention, the membrane sheets 25, 26 are supported in at least two directions: horizontally by the support struts 46 of the membrane module, horizontally and vertically by the backing plate 28, and vertically by the guide members 20. The ability to backwash a flat sheet membrane is advantageous in that down-time can be minimized. The proximity of the guide member 20 to the membrane module 16 also ensures effective scouring by the gas bubbles which are maintained in close contact with the membrane surfaces 18 and their flow directed along the channels 60 so that they will be in contact with the entire membrane surfaces 18 to scour these surfaces.

In one embodiment, the width of each channel 60 is approximately 10 cm although the invention is not limited to channels of this size. Preferably, the channels 60 should be sized and shaped to accommodate slug bubbles. The depth of the channels 60 are approximately 7 mm. In this embodiment, the width of the top and bottom edges 50, 52 are about 5 to 10 mm. The advantage of 10 cm channels is that larger gas bubbles, such as slug bubbles, can be accommodated in the channels. It is believed that slug bubbles can more effectively remove debris due to a "Taylor" effect. Other channel sizes are also within the scope of the present invention. When assembled, the membrane surfaces are provided with a roughly 10 cm by 10 cm support grid across the membrane surfaces because of the combination of the channels of the guide member and the support struts of the membrane module backing plate.

Each guide member 20 is provided with an attachment means for attaching the guide member 20 to a membrane module 16 or another guide member 20 or to the housing 24. In this embodiment, the attachment means corresponds to that of the membrane module 16 and is in the form of at least one arm or tab 64, preferably a pair, extending from the second side edge 56 of the guide member 20 and spaced from one another along the second side edge 56. Each arm 64 has an opening 66 for receiving the bar 44 which will also pass through similar attachment means in adjacent membrane modules 16 and guide members 20 to form the membrane module assembly 12. The bar 44 can also be attached to the housing 24 to secure the membrane module assembly 12 to the housing 24. Alternatively, the guide members 20 or the membrane modules 16 can be connected to each other or the housing 24 in any other way such as by welding or by gluing. Other detachable attaching mechanisms are also possible.

Preferably, the guide member 20 is formed from a material which is non-degradable in the water to be treated and which does not attract the solid debris in the water. In one embodiment, the guide member 20 is made of a polymer such as a polypropylene blend, and is preferably made by moulding.

Alternatively, the guide member 20 may be a plate with grooves formed thereon (not shown) for guiding air bubbles along its different faces. This embodiment is thought to be less effective than the present embodiment where the channels are open such that each gas bubble can communicate with two oppositely facing membrane surfaces.

In use, each guide member 20 is mounted adjacent to and touching at least one membrane module 16 such that the bars 58 and channels 60 extend vertically along the membrane surface 18. Each membrane module 16 fits within the top and bottom edges 50, 52 of each guide member 20 such that the top and bottom edges 50, 52 of the guide member 20 protrude beyond the membrane module. Therefore, the guide members 20 space each guide member 20, and hence each membrane module 16, from one another. When mounted, the bars 58 defining the channels 60 of the guide member 20 lie flush against the adjacent membrane surface so that gas bubbles traveling along the channel 60 are restricted in their movement along the channel 60 and cannot escape around the bars 58. A gas bubble entering one channel 60 at the bottom edge 50 will travel along the channel 60 and exit at the top edge 52. As the channels 60 extend across a membrane surface 18, the entire membrane surface will be scoured. The "V" shaped wedge 62 along the bottom edge 50 of each guide member 20 directs the gas bubbles to one or other of the membrane sheets 25, 26 of the membrane module 16 fitted within that guide member 20. For example, for the guide member 20 illustrated in FIG. 16, gas bubbles approaching the wedge 60 will either be directed towards the right and into the open end of the channels 60, or towards the left and into the open end of the channels 60 of an adjacent guide member 20. By virtue of the profile of the guide member, the gas bubbles directed to either side of the guide member 20 will be imparted with different velocities. Gas bubbles will collide with other gas bubbles redirected by adjacent guide members 20 to form larger bubbles and slug bubbles before rising in the channels and scouring the membrane surfaces 18.

Preferably, there is a guide member 20 interleaved between two membrane modules 16 and one adjacent the outer membrane module. The guide members 20 which are sandwiched between two membrane modules 16 will service the oppositely facing membrane surfaces 18 of the adjacent membrane modules 16. In use, gas bubbles traveling along a channel 60 will scour both the opposing membrane surfaces 18 (belonging to two adjacent membrane modules) with which they are in contact.

In this embodiment, the membrane modules 16 and the guide members 20 of a module are connected together by means of the bars 44 extending through the tab openings 42. Accordingly, the positions of the tabs 40 correspond to allow for the correct relative alignment of the guide members 20 and membrane modules 16. Once secured, there is little relative movement between the guide members 20 and their adjacent membrane modules 16. Alternatively, the membrane modules 16 and the guide members 20 may be connected together at one point along their length, instead of the two illustrated in this embodiment.

For further fixation, the membrane modules 16 can be welded or glued together at their first edges 32 once the guide members 20 are in position and then the membrane modules 16 welded or glued to the manifold 22. Advantageously, this allows for a strong connection whilst allowing for the guide members 20 to be moved or replaced easily and with minimal disruption to its neighbors. A guide member 20 and its respective membrane module can be removed for physical cleaning. To remove a guide member 20, the bars 44 are removed from the tab openings 42 and the membrane module assembly 12 fanned open at the second edges of the guide members and membrane modules 38, 56. The guide members 20 can then be removed and replaced as necessary and the module assembly 12 closed back up and bolted together with the bars 44.

Gas bubbles are generated by the aeration or gas bubble generation system 14 in conventional manner. The aeration system comprises at least one pipe 68 with openings (diffuser) positioned beneath the membrane module assembly 12 when the system 10 is assembled. The gas can be air to aerate the wastewater or any other gas such as nitrogen or oxygen, for example. The flow rate can be varied according to the size of the housing 24 or bioreactor and the size of the membrane module assembly 12. For a module containing 18 membrane modules and guide members, a gas bubble flow rate of about 80 L/min should suffice. The gas bubble generation may be continuous or intermittent and be coordinated in a regular gas scouring and backwash schedule depending on the suspended solids attempting to accumulate on the membrane surfaces. In the illustrated embodiment, the pipe openings are arranged to release gas bubbles of about 5-10 mm diameter or as large as possible to create slug bubbles in the channels.

As the gas flows out of the openings, gas bubbles are formed within the water to be treated in which the system 10 is immersed. The gas bubbles will rise through the water to be treated in a column of bubbles. The openings are positioned such that the vertically ascending bubbles reach the membrane module assembly 12. According to embodiments of the present invention, the direction of movement of the gas bubbles, as they rise through the wastewater, is then guided by the channels 60 such that the gas bubbles are made to contact all, if not substantial portions, of the membrane surfaces 18. The gas bubbles spread out across the channels 60 and travel upwardly along the channels 60. As the gas bubbles are directed along the membrane surfaces 18, they scour the surfaces dislodging accumulated debris on the surfaces and also preventing the accumulation of further debris. Debris dislodged from the membrane surfaces 18 either fall back into the water to be treated or are carried upwards with the bubbles and out of the membrane module assembly 12.

Such an arrangement has the effect of preventing or minimizing solid debris build up on the membrane surfaces 18. Without the guide members 20 positioned adjacent the membrane surfaces 18 gas bubbles released from the aeration system 14 will follow the path of least resistance through the water to be treated and not necessarily across the entire membrane surfaces 18. Even when flowing across the membrane surfaces 18, the gas bubbles will follow the path of least resistance, such as between the accumulated debris, and so will not come into contact with the entire membrane surface. The guide members 20 of the present invention solve this problem by guiding the flow of gas bubbles so that they flow along the full surfaces of the membrane modules 16 to prevent and remove debris accumulation across the surface. Further, as the guide members 20 are relatively fixed in relation to the membrane modules 16 and touching the membrane modules when assembled, they provide strength to the membrane modules 16 so that they can survive backwashing and its associated relatively high pressures.

It is envisaged that maintenance of the membrane module assemblies of the present invention will be required annually or at longer time intervals (i.e. less frequently) and can involve removal of the membrane modules assemblies to scrub them free of debris. Backwashing of the membrane module assemblies can be performed during the annual maintenance or part of the regular operation. For example, backwashing could be performed five to eight times a day, daily. The backwashing intervals could be determined by the volume of liquid filtered. Any sludge generated during operation can be drawn off on a regular basis.

It will be appreciated that existing bioreactors or wastewater treatment systems can be retrofitted with the system of the present invention. For example, the membrane filter system 10 of the present invention can be installed in the second compartment of a Bionest® wastewater treatment bioreactor (as described in WO 2003/027031 or WO 2009/033291) to provide ultra-, micro- or nanofiltration before disposal allowing for re-use of the treated water. It is estimated that six layers of membrane modules and their respective guide members are required per cubic meter of effluent from a Bionest® wastewater treatment bioreactor (as described in WO 2003/027031). The membrane filter system 10 of the present invention can also be used to treat water from a river or lake to provide ultra-, micro- or nanofiltration to supply potable water. Also, the membrane filter system 10 of the present invention can be installed in a tank fed with raw wastewater as a stand alone treatment system to provide ultrafiltration. As the membrane module assembly is modular, it can be adapted to suit any requirement. The membrane module assemblies of the present invention can be incorporated into or part of any waste water treatment system. For example, the permeate/effluent from the present membrane assembly can be pre-treated or further treated such as by denitrification or dephosphatation.

Although the present invention has been described hereinabove by way of preferred embodiments thereof, it can be modified without departing from the spirit and nature of the subject invention as defined in the appended claims. For example, the guide member and the membrane module may be formed separately as shown and assembled together, or may be a single integral piece. The guide member can be used with any type of flat sheet membrane or flat sheet membrane module and is not limited to the membrane module described herein. Also, the channels have been illustrated as extending along the guide member in a straight line. However, the channels can trace other patterns along the guide member such as wavy lines. The channels can also extend partially across the guide member. The channels may be any other form of guiding means suitable for guiding gas bubbles along a surface. For example, instead of channels, there may be provided other types of openings, perforations, grooves, guides or slits. The guide member may have a single channel. The diffuser may be integral with a part or whole of the membrane module.

What is claimed is:

1. A guide member for directing gas bubble flow along a membrane surface, the guide member being arranged to be placed adjacent the membrane surface, the guide member comprising:

first and second side edges and at least one bar parallel to each of the first and second side edges, each of the first side edge, the second side edge and the at least one bar extending vertically in a row adjacent the membrane surface, in use, to define a plurality of vertical channels, the at least one bar extending perpendicularly from the membrane surface, and each one of the plurality of vertical channels having an open channel bottom end through which a plurality of gas bubbles enter the one of the plurality of vertical channels and an open channel top end through which the plurality of gas bubbles exit the one of the plurality of vertical channels so that gas bubbles flowing upwardly along the one of the plurality of vertical channels are in contact with the membrane surface and guided along the membrane surface; and a diverting means adjacent the open channel bottom end configured to direct a first portion of the plurality of gas bubbles in a first direction towards the open channel bottom end.

2. A guide member according to claim 1, wherein the diverting means is further configured to direct a second portion of the plurality of gas bubbles in a second direction towards an adjacent membrane surface.

3. A guide member according to claim 2, wherein the diverting means is configured to impart different velocities on the first portion and the second portion of the plurality of gas bubbles respectively directed in the first and second directions.

4. A guide member according to claim 2, wherein the diverting means comprises a first arm for directing the first portion of the plurality of gas bubbles in the first direction and a second arm for directing the second portion of the plurality of gas bubbles in the second direction, the first and second arms being in a substantially "V" shaped configuration.

5. A guide member according to claim 4, wherein the first arm is longer than the second arm.

6. A guide member according to claim 5, wherein the first arm has a bend in it.

7. A guide member according to claim 1, wherein each channel is about 10 cm wide.

8. A guide member according to claim 1, further comprising an attachment means for detachably attaching the guide member to a housing, to another guide member or to a membrane module.

9. A guide member according to claim 8, wherein the attachment means comprises at least one tab extending from the second side edge, the tab having an opening.

10. A guide member according to claim 8, wherein the attachment means comprises two tabs, each tab having an opening and extending from the second side edge.

11. The guide member according to claim 1, wherein the at least one bar further comprises two or more bars.

12. The guide member according to claim 11 wherein the at least one bar further comprises at least six bars.

* * * * *